United States Patent [19]

Okada

[11] Patent Number: 5,208,683
[45] Date of Patent: May 4, 1993

[54] FACSIMILE APPARATUS
[75] Inventor: Osamu Okada, Tokyo, Japan
[73] Assignee: Konica Corporation, Tokyo, Japan
[21] Appl. No.: 383,544
[22] Filed: Jul. 24, 1989
[30] Foreign Application Priority Data
 Jul. 25, 1988 [JP] Japan ................................ 63-185230
[51] Int. Cl.$^5$ .............................................. H04N 1/32
[52] U.S. Cl. .................................... 358/468; 358/444; 341/22
[58] Field of Search ............... 353/401, 468, 448, 444; 379/100; 341/22

[56] References Cited
U.S. PATENT DOCUMENTS

| | | | |
|---|---|---|---|
| 4,587,633 | 5/1986 | Wang et al. | 358/403 |
| 4,646,160 | 2/1987 | Iizuka et al. | . |
| 4,754,335 | 6/1988 | Izawa et al. | 379/100 |
| 4,764,951 | 8/1988 | Kotani et al. | . |

FOREIGN PATENT DOCUMENTS
3439867A1 5/1985 Fed. Rep. of Germany .

OTHER PUBLICATIONS
Patent Abstract of Japan, unexamined applications, E field, vol. 12, No. 77 (E-589)<2924>, Mar. 10, 1988.
The Patent Office Japanese Government p. 87 E 589 Kokai-no. 62-216 467 (Fujitsu Ltd.).
European Search Report No. EP-89307469.0, Apr. 9, 1990.
Wordperfect Manuel "Macro" 1987.

Primary Examiner—Edward L. Coles, Sr.

[57] ABSTRACT

A facsimile apparatus includes a plurality of one-touch keys, a plurality of function keys, and a memory. The plurality of function keys are used to set predetermined functions. The memory holds a plurality of different functions which are set by the function keys with respect to each one-touch key.

7 Claims, 3 Drawing Sheets

FACSIMILE APPARATUS

BACKGROUND OF THE INVENTION

1. FIELD OF THE INVENTION

The present invention relates to a facsimile apparatus having a memory capable of registering all the operations required for transmission with one-touch keys.

2. DESCRIPTION OF THE PRIOR ART

In functional memory used in conventional facsimile apparatus, contents which can be stored in the memory areas of one-touch keys are limited to telephone numbers (and names) of destinations for transmission.

In such conventional memory, only one function can be registered in the memory area of a one-touch key, and hence a one-touch key and a function have one-to-one correspondence.

With an increase in the number of functions of facsimile apparatus and a decrease in the size thereof, of facsimile apparatus a demand recently has arisen for a decrease in the number of on keys of an operation display section arranged in the apparatus. For this reason, in conventional apparatus, a plurality of keys are combined to store and reproduce a required number of functions.

Consequently, key operation becomes complicated. A strong demand, therefore, has arisen for a one-touch key capable of storing a plurality of functions in its memory area. Such a one-touch key is advantageous in that necessary functions can be quickly reproduced without a complicated operation sequence.

In a conventional facsimile apparatus, however, a one-touch key and a function have one-to-one correspondence. Since two key operations for, e.g., selecting a phone number and a line density are often required in transmission, operation becomes complicated in spite of the use of one-touch keys. If an apparatus is designed such that a plurality of desired functions can be stored in the memory area of a one-touch key, it is difficult to ensure a required memory capacity.

In the conventional apparatus, according to the relationship between a one-touch key and a function to be stored, one memory area is assigned to one function as shown in FIG. 1. Therefore, the memory capacity of one touch-key must be increased with an increase in the number of functions to be registered in its memory area.

There are almost an innumerable number of combinations of functions. With multi-address calling, about 200 combinations of functions are required. Therefore, if the number of one-touch keys is set to be 40; and the number of functions, 200, and five bytes are assigned to each function, 40 Kbytes are required as a memory capacity for the functions.

In addition, functions are seldom registered in the memory area of a one-touch key to its maximum registration number. That is, memory tends to be wasted.

If the number of functions is limited, the memory capacity can be reduced accordingly. However, since limitation in number of functions means limitation in number of functions to be registered, an original purpose, i.e., easy operation cannot be achieved.

SUMMARY OF THE INVENTION

Therefore, an object of the present invention is to solve the above-described conventional problems with a simple arrangement and to provide a facsimile apparatus having a memory capable of reducing its memory capacity without limiting the number of functions to be registered.

In order to achieve the above object, according to the present invention, a plurality of one-touch keys capable of reproducing a plurality of functions with a single key operation are provided, and a sequence of keys which are operated in an interval between an instant when one of the one-touch keys is designated and an instant when the one-touch key is registered in a one-touch key setting mode is stored, whereby all functions selected in the interval are registered in a memory area of the one-touch key.

After a one-touch key is designated in the one-touch key setting mode, an operation sequence of each function is stored as it is.

When, for example, a density is to be selected, the selection result (e.g., "high" density) is not stored. A high density is designated in accordance with the following sequence:

1. selection of a density key ("LOW" is displayed in this case),
2. selection of an UP key ("INTERMEDIATE" is displayed by this operation), and
3. selection of the UP key (the display is changed to "HIGH" by this operation). The content which is selected by the last operation is the function which a user wants to register.

According to the present invention, the sequence of the first to third operations is stored as codes representing the operated keys.

Since a capacity of about one byte is sufficient for each operation, if 200 functions are registered in the memory area of a single one-touch key, and one function requires four operations, the memory capacity required for the one-touch key is as small as 800 bytes.

The number of functions to be registered in the memory area of a one-touch key does not normally exceed five. Therefore, if four operations are required to register one function, about 20 operations are required. If 40 one-touch keys are arranged in consideration of practical applications, a memory capacity of only about 0.8 Kbytes (see FIG. 5) is required. Note that even in this case, the number of functions to be registed in the memory area of a one-touch key is not limited.

DETAILED DESCRIPTION OF THE PREFERRED EMBODIMENT

A facsimile apparatus having a memory according to the present invention will be described in detail below with reference to the accompanying drawings.

Figure 1:
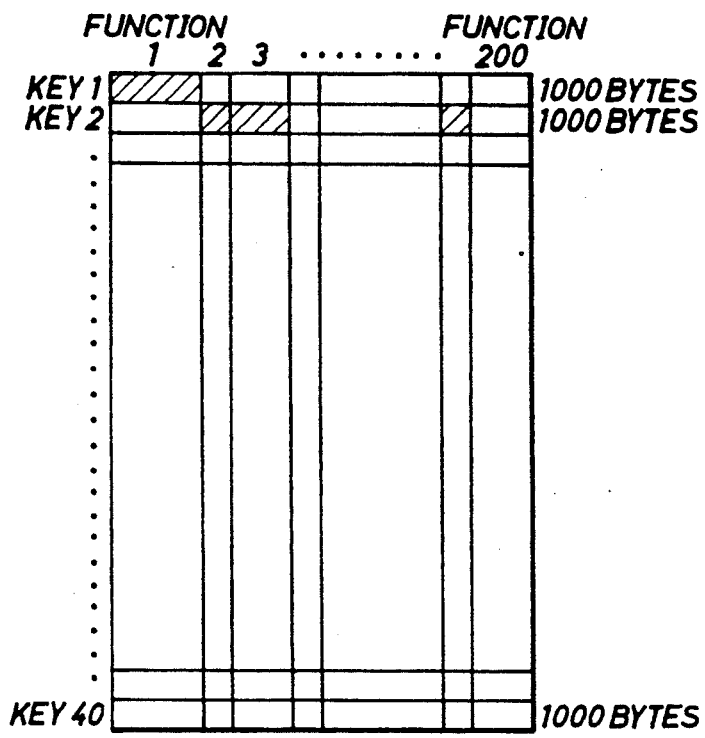
FIG. 1 is a view showing an application of a memory used in a conventional facsimile apparatus.
Figure 2:
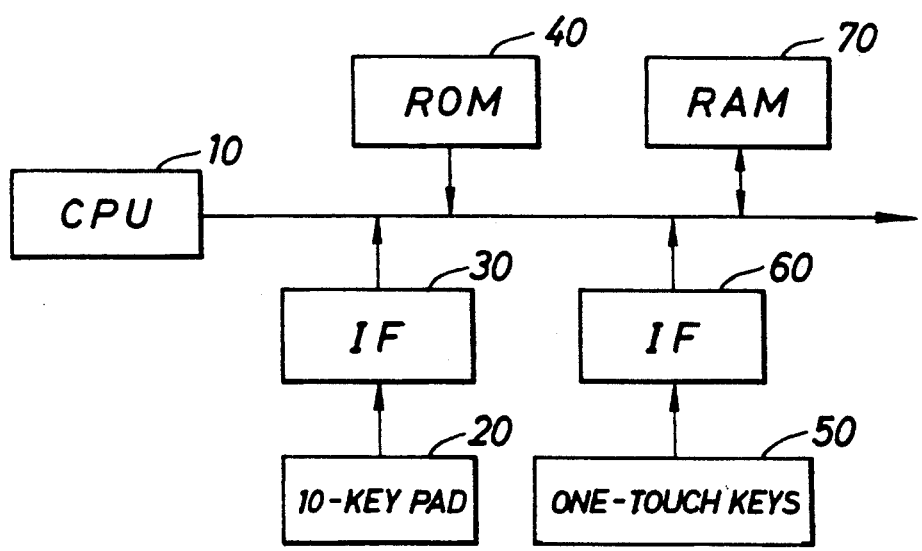
FIG. 2 is a block diagram showing a main part of a facsimile apparatus of the present invention.

FIG. 2 shows the overall system of a memory of a the facsimile apparatus. Reference numeral 10 denotes a CPU for controlling the facsimile apparatus. The facsimile apparatus main body comprises operation display section 80 shown in FIG. 3. Key inputs from ten-key (10-key) pad 20 of keys arranged on section 80 are fetched by CPU 10 through interface 30 so as to execute necessary processing.

Operation display section 80 comprises a plurality of (40 in this case) one-touch keys 50 (as will be described later). Key inputs from these one-touch keys are fetched by CPU 10 through interface 60. An operation of one-touch keys 50 will be described below.

Reference numeral 40 denotes a ROM; and 70 denotes a RAM. ROM 40 stores various control programs.

RAM 70 stores data representing an operation sequence of a function to be registered with each one-touch key 50.

Figure 3:
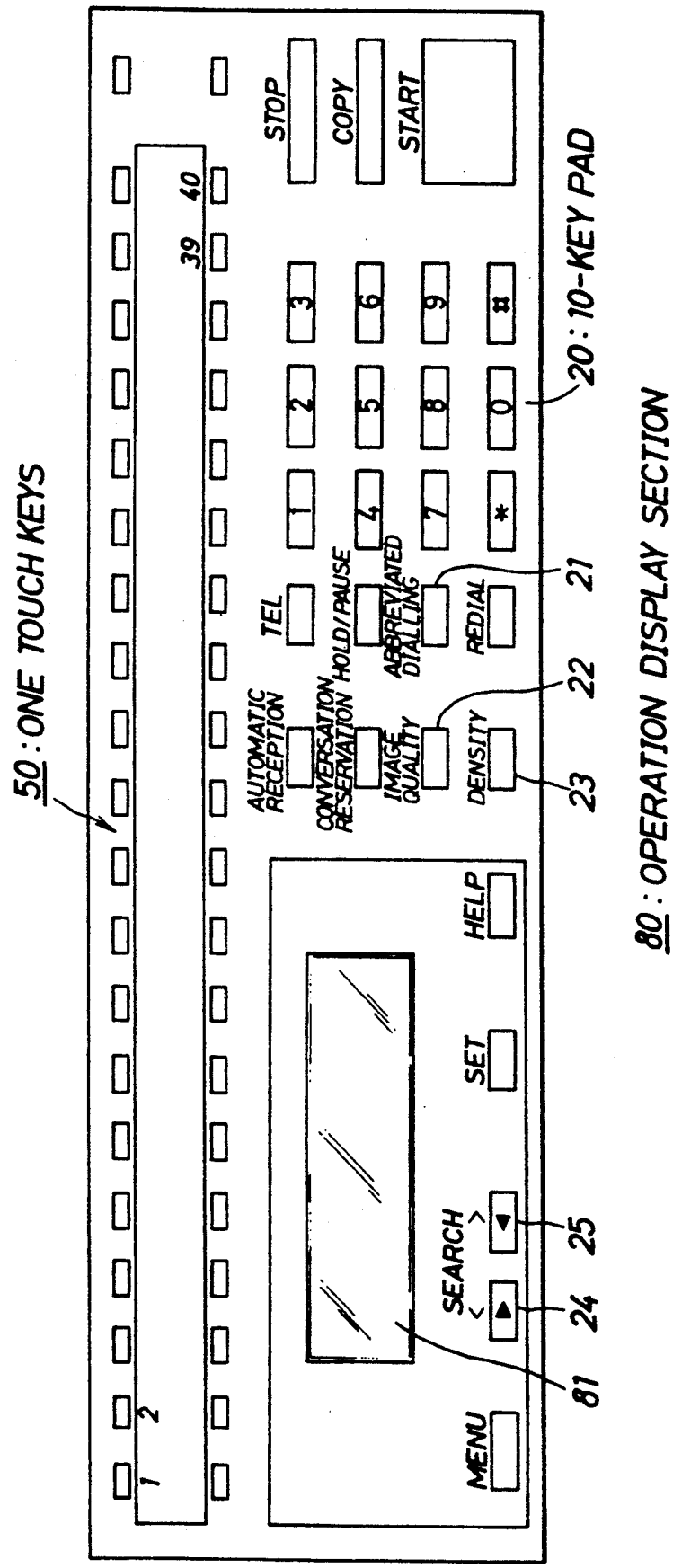
FIG. 3 is a plan view showing an operation display section of the facsimile apparatus of the present invention.

FIG. 3 shows an arrangement of operation display section 80. In addition to the above-described ten-key pad 20 and one-touch keys 50, section 80 comprises various operation keys required for a facsimile apparatus. A detailed description of these operation keys will be omitted. Reference numeral 21 denotes an abbreviated dialling, key 22 denotes an image quality selection key (line density selection key 22 denotes a density selection key, 24 and 25, denote search keys (shift keys), i.e., UP and DOWN keys, respectively, and 26 denotes a menu key for selecting a special mode such as a one-touch setting mode.

Reference numeral 81 denotes a display portion composed of a liquid crystal or the like.

The above-described one-touch keys 50 are keys each of which can simultaneously register a plurality of functions as well as the telephone number and name of a destination. These registered contents can be reproduced with a single key operation.

Figure 4:
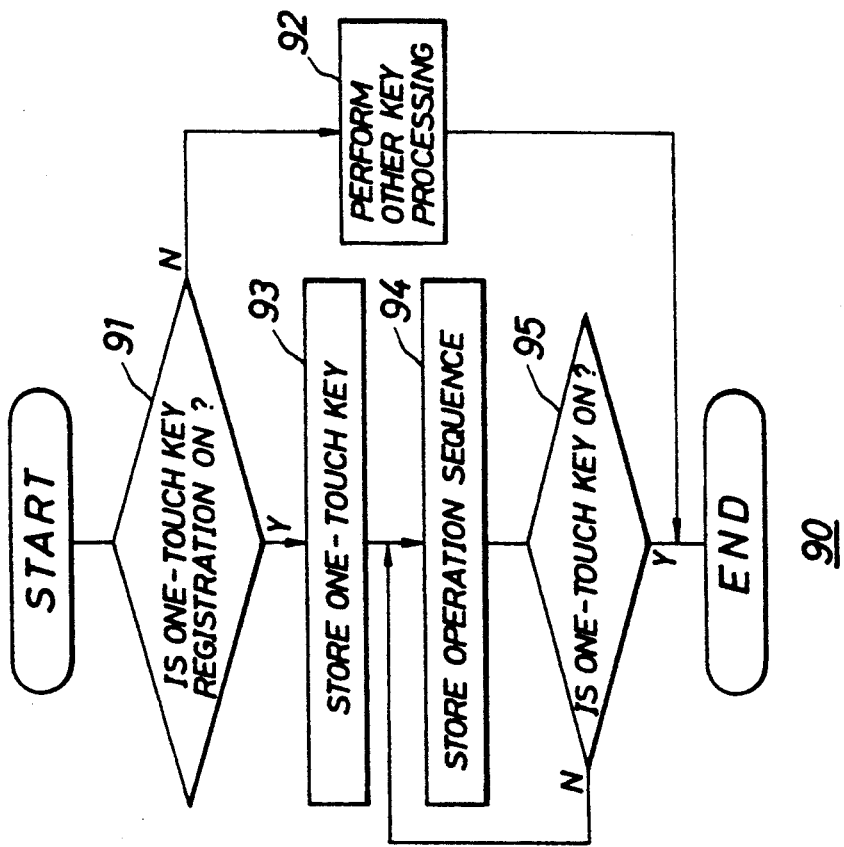
FIG. 4 is a flow chart showing a registration sequence of a with respect to a one-touch key.

FIG. 4 is a flow chart showing a registration sequence of each one-touch key described above. Various types of key operations are performed by using the keys arranged on operation display section 80, and at the same time the presence/absence of a registration operation with respect to a one-touch key is checked. If a key operation other than a key operation for registration with respect to a one-touch key is performed, processing corresponding to the operated key is executed (steps 91 and 921. If the operation is for registration with respect to a one-touch key, the key number of a subsequently operated one-touch key is stored (steps 91 and 93).

Subsequently, contents to be registered in the memory area of the designated one-touch key (denoted by X in this case) are selected. The contents include various functions such as a telephone number, a name, an abbreviated number, a line density, and a transmission speed. Function keys corresponding to these functions are operated, and at the same time the operation sequence of these key operations is stored as it is (step 94). This processing is continued until the previously designated one-touch key X is operated again (step 95).

That is, an operation sequence of all the keys operated in an interval between the instant when a one-touch key is designated and the instant when the one-touch key is registered by operating the one-touch key again is stored as it is. In this case, codes representing the operated keys themselves are sequentially stored. Each key code is a fixed-length code.

Such processing is executed every time a one-touch key is designated.

The following table shows an example of registration with respect to a one-touch key.

In this case, since the frequency of use of a preset abbreviated number is high, the abbreviated number as well as an image quality (fine mode) and a density (high) are stored in the memory area of a one-touch key. The table shows an operation sequence for such processing. With this processing, transmission is started with respect to the destination of this abbreviated number with the set image quality and density.

| Key Operation | Sequence | |
|---|---|---|
| setting of one-touch key | 1 | |
| designation of one-touch key (No. X) | 2 | |
| abbreviated dialling mode | 3 | |
| abbreviated number # | 4 | |
| abbreviated number m | 5 | 3–11" |
| abbreviated number n | 6 | functions registered at X key: |
| image quality ("NORMAL") | 7 | (1) #mn |
| UP key ("FINE") | 8 | (2) FINE |
| density ("LOW") | 9 | (3) HIGH |
| UP key ("INTERMEDIATE") | 10 | |
| UP key ("HIGH") | 11 | |
| registration of one-touch key (No. X) | 12 | |

More specifically, the following operations are performed:

1. A mode for setting a one-touch key is selected by operating the menu key.
2. The one-touch key is designated by operating the one-touch key X to be registered.
3. An abbreviated dialling mode is selected by operating the abbreviated dialling key.
4. An abbreviated number # is set by operating the ten-key pad.
5. A first digit m of the abbreviated number is selected by operating the ten-key pad.
6. A second digit n of the abbreviated number is selected by operating the ten-key pad.
7. An image quality (transmission speed) mode is selected by operating the image selection key (in the image quality mode, a normal mode and a fine mode can be selected in this order). When the image quality mode is selected, "NORMAL" is immediately displayed.
8. The fine mode is selected by operating the UP key 24.
9. A density selection mode is selected by operating the density selection key. In this mode, three types of densities, i.e., "LOW", "INTERMEDIATE", and "HIGH" are normally selected in this order. When the density mode is selected, "LOW" is displayed.
10. When the UP key is depressed, the display is changed to "INTERMEDIATE".
11. When the UP key is depressed again, the display is changed to "HIGH".
12. The designated one-touch key X is operated again.

With this series of operations, all the following contents are registered in the memory area of the one-touch key X:

abbreviated number=#mn
   image quality=fine
   density=high density

The one-touch key setting mode is released when the registration of the one-touch key X is completed upon operation of the one-touch key X in the sequence step of item 12 above.

In the scheme of sequentially storing an operation sequence of keys, since the contents of a function represented by each key need not be stored, only a memory capacity enough to identify operated keys is required. Therefore, a capacity of about one byte is enough for one operation.

Figure 5:
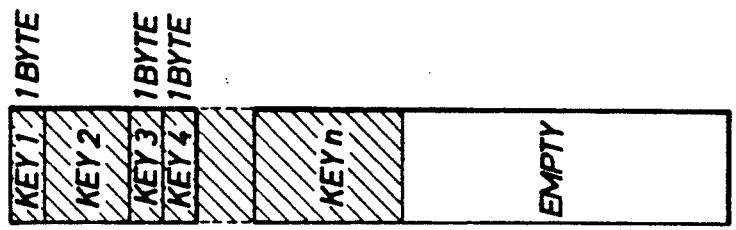
FIG. 5 is a view showing an application of a memory capacity.

In addition, telephone numbers and the number of functions to be registered in the memory areas of the one-touch keys normally vary depending on destinations. For this reason, the memory capacity of a one-touch key is not a fixed capacity but a variable capacity, which varies in size depending on the number of functions to be registered. FIG. 5 shows such a memory capacity.

Since a capacity of about one byte is enough for each operation, if four key operations are required for one function, and 200 functions are registered in the memory area of a single one-touch key, the one-touch key requires only 800 bytes as its memory capacity.

The number of functions to be registered in the memory area of a one-touch key does not normally exceed five. Therefore, if one function requires four operations, about 20 operations are required for five functions. If 40 one-touch keys are arranged in consideration of practical applications, a memory capacity of 0.8 to 1.0 Kbyte should be sufficient (see FIG. 5). Note that even in this case, the number of functions to be registered in the memory area of a one-touch key is not limited.

As has been described above, according to the present invention, since transmission conditions based on a telephone number, image quality, and a density, which are preset upon operation of a single one-touch key, can be automatically set, a transmission operation can be greatly facilitated. When a one-touch key is designated, an operation sequence of keys which are subsequently operated is stored as codes representing the operated keys.

With this arrangement, the memory capacity required for a single one-touch key can be greatly reduced as compared with the conventional apparatus.

According to this arrangement, since the relationship between a one-touch memory and a memory capacity assigned thereto is not fixed, a function memory can be effectively used.

Since the number of functions which can be registered in the memory area of a one-touch key is not limited, easy operation is not prevented by a limitation in number of functions to be registered.

What is claimed is:

1. A facsimile apparatus comprising:

a plurality of one-touch keys, each for reproducing a combination of predetermined functions of the apparatus;
    a plurality of function keys for setting a predetermined function; and
    memory means for holding an identity of a plurality of different functions which are set by said function keys for each one-touch key, wherein the identity of the plurality of different functions includes a sequence in which said function keys are operated after designations of one of said one-touch keys until registration of said one-touch key.

2. An apparatus according to claim 1, wherein said functions include setting of a telephone number of a destination for transmission and a density of an image to be transmitted by the apparatus.

3. An apparatus according to claim 1, wherein said functions include setting of a telephone number of a destination for transmission and quality of an image to be transmitted by the apparatus.

4. A facsimile apparatus comprising:

a plurality of one-touch keys, each one-touch key for reproducing a combination of predetermined functions of the apparatus;
    a plurality of function keys for setting a predetermined function; and
    memory means for each one-touch key for holding an identity of a plurality of different predetermined functions set by the function keys, wherein the identity of the plurality of different predetermined functions includes a sequence of operation of the function keys after designation of one of the one-touch keys until registration of the one-touch key.

5. The facsimile apparatus of claim 4, wherein a capacity of the memory means of each of the one-touch keys is variable.

6. A facsimile apparatus comprising:

a plurality of function keys for setting a predetermined function;
    a memory means for registering an identity of a sequence of operation of said function keys; and
    a one-touch key for reproducing said sequence of operation registered in said memory means, wherein said registered operation is operated after designation of said one-touch key until registration of said one-touch key.

7. The facsimile apparatus of claim 6, wherein a capacity of said memory means is variable.

* * * * *

UNITED STATES PATENT AND TRADEMARK OFFICE
CERTIFICATE OF CORRECTION

PATENT NO. : 5,208,683
DATED : May 4, 1993
INVENTOR(S) : Okada

It is certified that error appears in the above-indentified patent and that said Letters Patent is hereby corrected as shown below:

On the title page, before item [57] Abstract, insert --Attorney, Agent, or Firm  Finnegan, Henderson, Farabow, Garrett and Dunner--.

Signed and Sealed this

First Day of November, 1994

Attest:

BRUCE LEHMAN

Attesting Officer

Commissioner of Patents and Trademarks